(No Model.)

T. MAXON.
DISK HARROW.

No. 420,817. Patented Feb. 4, 1890.

Witnesses
C. W. Conboye
C. A. Davis

Inventor
Thomas Maxon
By his Attorneys
C. M. Alexander

UNITED STATES PATENT OFFICE.

THOMAS MAXON, OF DAYTON, OHIO.

DISK HARROW.

SPECIFICATION forming part of Letters Patent No. 420,817, dated February 4, 1890.

Application filed October 1, 1889. Serial No. 325,641. (No model.)

*To all whom it may concern:*

Be it known that I, THOMAS MAXON, a citizen of the United States, residing at Dayton, in the county of Montgomery and State of Ohio, have invented certain new and useful Improvements in Disk Harrows, of which the following is a specification, reference being had therein to the accompanying drawings, in which—

Figure 1:
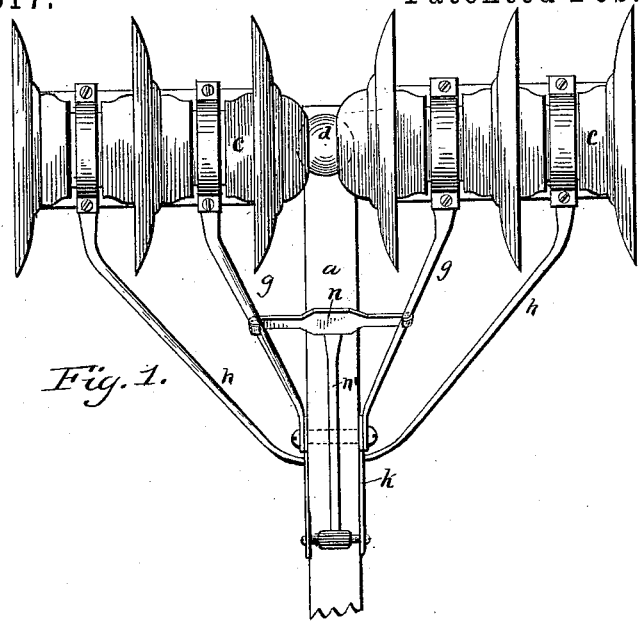
Figures 2, 3:
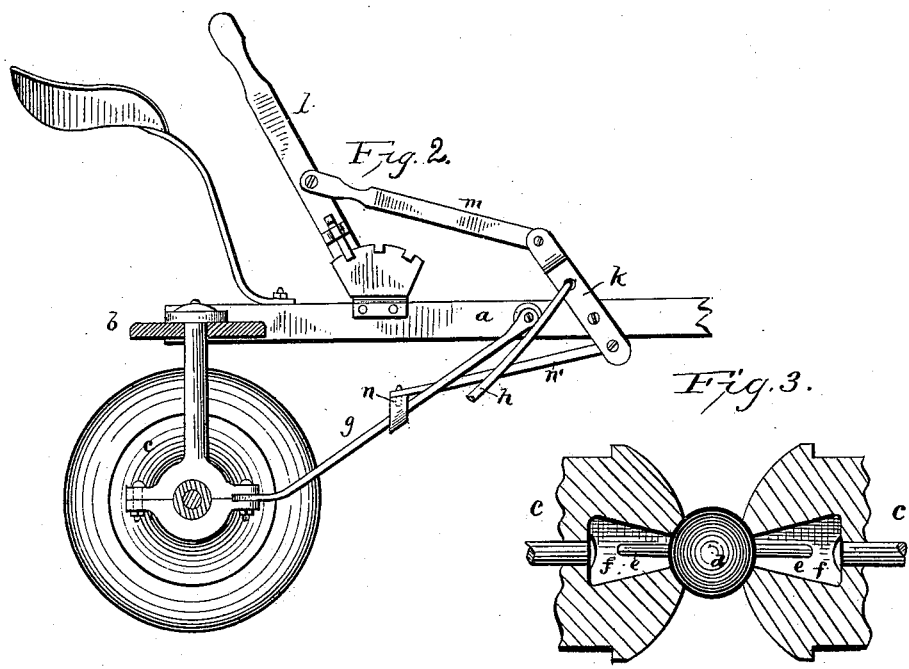

Figure 1 represents a bottom view of my improved harrow complete; Fig. 2, a longitudinal sectional view of the same; and Fig. 3, a detail sectional view of the adjacent ends of the gangs, showing the sphere adapted to receive the end-thrust of the gangs.

The invention relates to certain improvements upon that class of harrows known as "disk harrows," wherein are employed two rotary gangs of disks arranged in line with each other upon opposite sides of the draft-pole and pivotally connected thereto, means being provided for shifting the angle of the gangs with respect to the pole, as will be more fully hereinafter set forth.

The present invention has mainly for its objects the provision of simple means for preventing the inner adjacent ends of the gangs from rising or "riding" upon each other in turning curves or operating upon irregular ground, the said means also serving to reduce the friction caused by the end-thrust of the gangs to a minimum, and at the same time leave the gangs perfectly flexible and free to revolve independently of each other, as will presently appear.

The invention is also designed to provide a simple contrivance for preventing the gangs spreading apart while in operation, thereby retaining the device employed to receive the end-thrust of the gangs in place, and also serving to relieve the bearings of the gang-shafts of undue endwise pressure, as will more fully hereinafter appear.

In the drawings annexed, $a$ designates the pole or tongue, provided at its rear end with a rigid cross-beam $b$, to the ends of which are pivotally attached the inner ends of the gang-beams. Journaled in bearings attached to the gang-beams are the gang-shafts $c$, provided with a suitable number of cutting and pulverizing disks. The inner ends of the gangs are provided with similar concave depressions for the reception of a bearing ball or sphere $d$, which is free to revolve with the gangs. This ball is provided with two pins $e$, which project from diametrically-opposite points on the ball and enter enlarged recesses $f$, formed in the gangs back of the concave depressions for the ball. This ball receives the end-thrust of the gangs and reduces the friction caused by their opposing action to a minimum. It also prevents the gangs riding upon each other and rising or lifting up at their inner ends while operating upon irregular ground or in turning curves when one gang revolves at a greater speed than the other. The pins on the ball serve to prevent the same from being displaced should the gangs be temporarily spread apart by an obstruction or by irregular ground, the pins serving to guide the ball back to its proper position when the gangs come together again. The recesses into which the pins project are enlarged to allow a free oscillatory movement of the pins while the gangs are operating.

The inner shifting rods $g$ pivotally connect the inner bearings of the gangs to the respective sides of the draft-pole, and the outer shifting rods $h$ pivotally connect the outer gang-bearings to the respective sides of a yoke or levre $k$, pivoted upon the tongue. By this arrangement of rods it will be perceived that when the operating-lever $l$ (which is connected to yoke $k$ by a rod $m$) is moved forward the outer ends of the gangs will move forward and their inner ends slightly backward, causing the inner shifting rods $g$ to come closer together at their rear ends, this action being permitted by reason of the fact that the inner gang-bearings form the pivots of their respective gangs. When the lever is moved backward, the movement of the gangs and rods will be reversed, thereby enabling the driver to adjust the gangs at the desired angle to the pole.

In order to prevent the gangs from spreading apart, I connect the two inner shifting rods $g$ together by a bar $n$, which is provided with hooks at its ends to loosely embrace the respective shifting rods. To move this bar along upon the rods whenever the same are spread or brought close together, I connect it with the lower end of the lever $k$ by a rod $n'$. By thus connecting the sliding rod $n$ to the lever $k$ it will observed that whenever the inner rods are spread this rod $n$ will move forward, and whenever they are brought close together this sliding bar is moved backward, thereby serving to effectually prevent the gangs spreading or rising at the inner ends at whatever position they may be adjusted. This sliding bar $n$ also serves to prevent the interposed sphere becoming displaced by the spreading of gangs.

Having thus described my invention, what I claim is—

1. The combination of a pair of disk-gangs provided with spherical depressions in their inner ends and enlarged recesses $f$, and a ball $d$, resting in said depressions and provided with diametrically-opposite pins $e$, which work in the said enlarged recesses $f$, substantially as described.

2. The combination, with the tongue and gangs, of the shifting rods and levers for operating the gangs, and a sliding bar connecting the inner shifting rods, as and for the purpose described.

3. The combination, with the tongue and gangs, of the inner shifting rods pivotally connecting the gangs to the tongue, a lever $k$, pivoted upon the tongue, shifting rods connecting this lever to the gangs, a sliding bar $n$, connecting the inner shifting rods, and a rod connecting this bar $n$ to the shifting lever $k$, as and for the purposes set forth.

In testimony whereof I affix my signature in presence of two witnesses.

THOMAS MAXON.

Witnesses:
JAMES D. GRIMES,
JOHN L. H. FRANK.